Sept. 6, 1955 G. R. PIPES ET AL 2,717,179
COVERS FOR VEHICLE WHEELS
Filed June 4, 1952 4 Sheets-Sheet 1

INVENTORS
GEORGE R. PIPES
HOWARD J. FINDLEY
BY
Williams, David & Hoffmann
ATTORNEYS

INVENTORS
GEORGE R. PIPES
BY HOWARD J. FINDLEY
ATTORNEYS

Sept. 6, 1955  G. R. PIPES ET AL  2,717,179
COVERS FOR VEHICLE WHEELS
Filed June 4, 1952  4 Sheets-Sheet 3

INVENTORS
GEORGE R. PIPES
BY HOWARD J. FINDLEY
ATTORNEYS

Sept. 6, 1955
G. R. PIPES ET AL
2,717,179
COVERS FOR VEHICLE WHEELS
Filed June 4, 1952
4 Sheets-Sheet 4
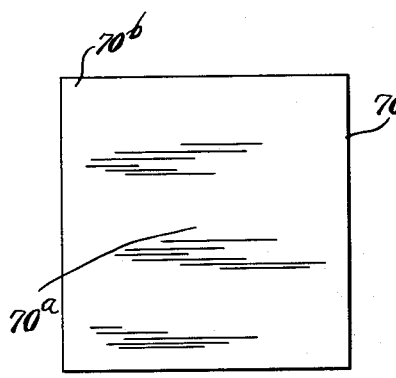
FIG. 15
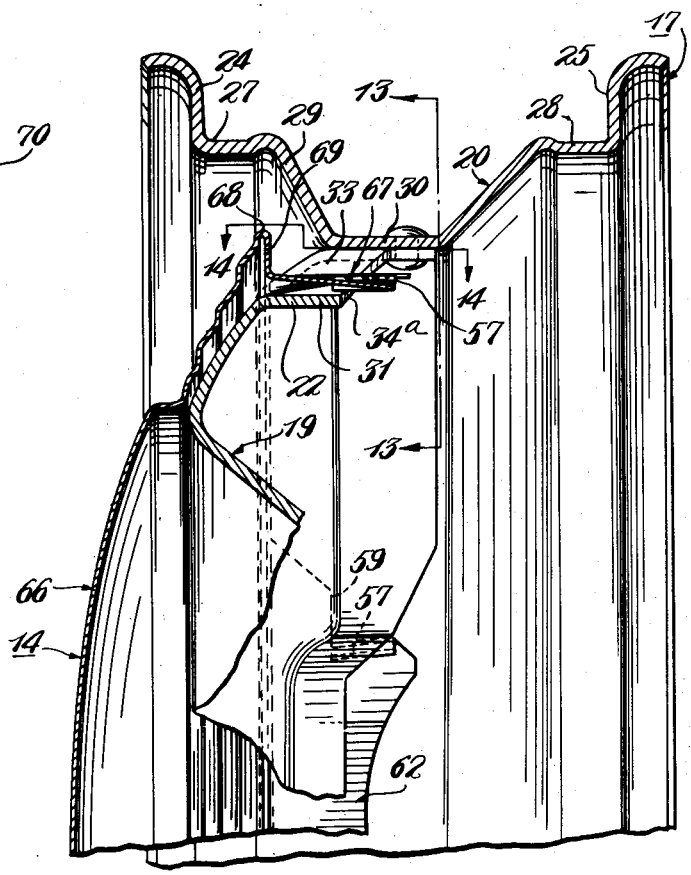
FIG. 12
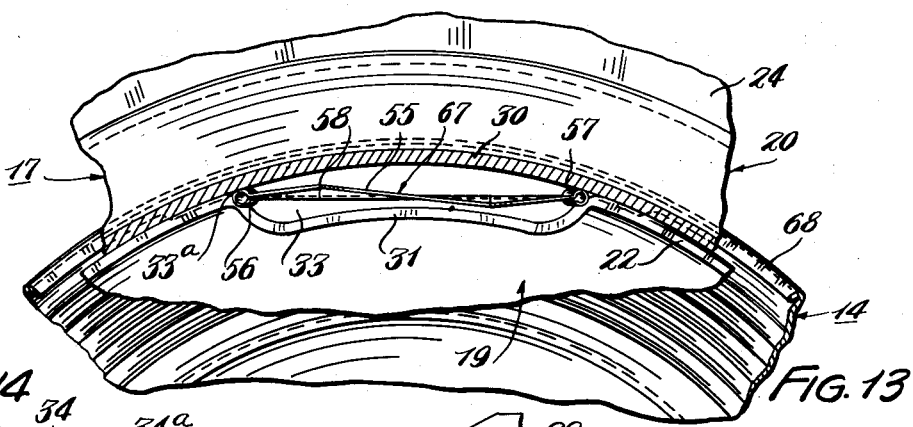
FIG. 14
FIG. 13
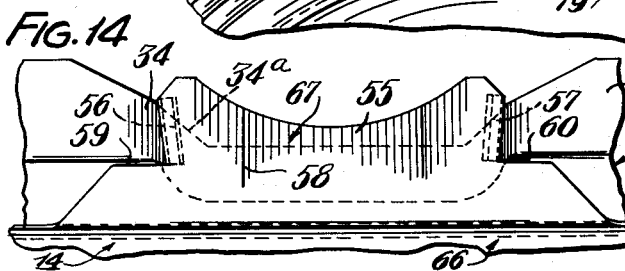
INVENTORS
GEORGE R. PIPES
BY HOWARD J. FINDLEY
Hudson, Boughton,
Williams, David & Hoffmann
ATTORNEYS

United States Patent Office 2,717,179
Patented Sept. 6, 1955

2,717,179

COVERS FOR VEHICLE WHEELS

George R. Pipes, Mayfield Heights, and Howard J. Findley, Cleveland, Ohio, assignors to Eaton Manufacturing Company, Cleveland, Ohio, a corporation of Ohio Application June 4, 1952, Serial No. 291,722

12 Claims. (Cl. 301—37)

This invention relates to wheel covers of the kind which form both a trim device and a protective outer shield when they are applied to vehicle wheels.

An object of the present invention is to provide a novel construction for wheel covers of this kind such that the covers comprise a minimum number of parts and can be economically produced and, although they can be quickly and easily applied to the vehicle wheels and will be securely retained thereon, they can, nevertheless, be readily removed whenever desired by a simple prying operation.

Another object is to provide a novel construction for a wheel cover comprising a disk member and a group of retaining members projecting rearwardly therefrom and in which the retaining members are disposed in an annular series and are resiliently flexible substantially in the direction of the circumference of the series.

A further object is to provide a novel vehicle wheel construction comprising a wheel formed by connected body and rim parts and having circumferentially spaced and circumferentially elongated openings between cooperating portions of the body and rim parts and a cover having an annular series of rearwardly projecting retaining members engaging in such openings, and in which the retaining members are circumferentially elongated and disposed in a series in a substantially circumferentially edgewise aligned relation and are compressible and expansible substantially edgewise thereof and substantially in the direction of the circumference of the series.

Still another object is to provide a novel construction for a wheel cover of the kind above referred to in which the retaining members are formed by bent wire.

Yet another object is to provide a novel construction for a wheel cover of the character mentioned above in which the retaining members are made of formed sheet metal.

An additional object is to provide a novel construction for a wheel cover of the character just mentioned in which the retaining members are made of sheet metal and each comprises a corrugated web which is resiliently flexible edgewise thereof.

As a further object, this invention provides a wheel cover construction of the kind mentioned above in which the retaining members have locking elements on opposite edges thereof.

It is also an object of this invention to provide a wheel cover of the character mentioned in which the disk member and the retaining members are formed by integrally connected portions of a single sheet metal blank.

Other objects and advantages will be apparent in the following detailed description and in the accompanying sheets of drawings in which:

Fig. 12 is a partial transverse vertical section similar to Figs. 2, 6 and 9, but showing a one-piece sheet metal cover representing still another modified form of the novel wheel cover;

Fig 13 is a partial vertical section taken through the wheel and looking toward the cover as indicated by section line 13—13 of Fig. 12;

Fig. 14 is a partial circumferential section taken through the vehicle wheel at the location of one of the retaining members of the modified cover of Fig. 12, the view being taken as indicated by section line 14—14 of Fig. 12; and Fig. 15 is a plan view showing a sheet metal blank from which the one-piece wheel cover of Fig. 12 is made.

Figure 6:
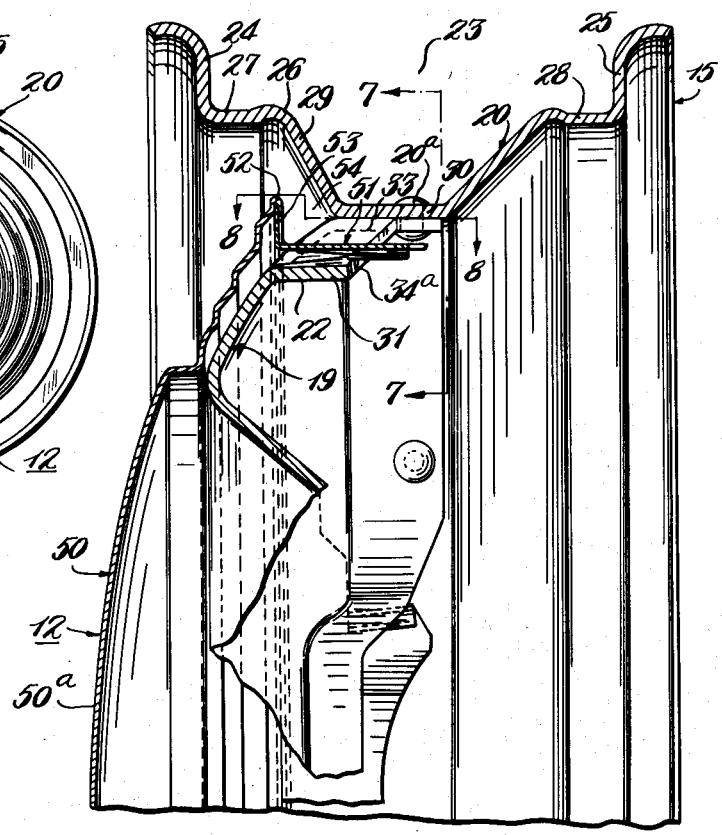
Fig. 6 is a partial vertical section taken through the vehicle wheel and modified cover substantially as indicated by section line 6—6 of Fig. 5.
Figure 7:
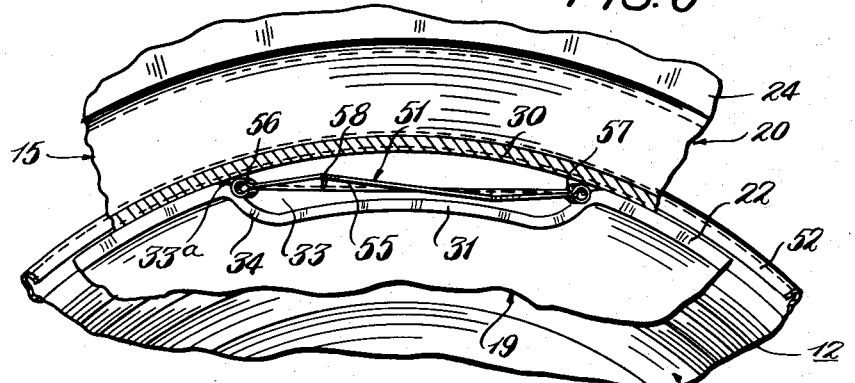
Fig. 7 is a partial vertical section taken through the wheel and looking toward the cover as indicated by section line 7—7 of Fig. 6.
Figure 9:
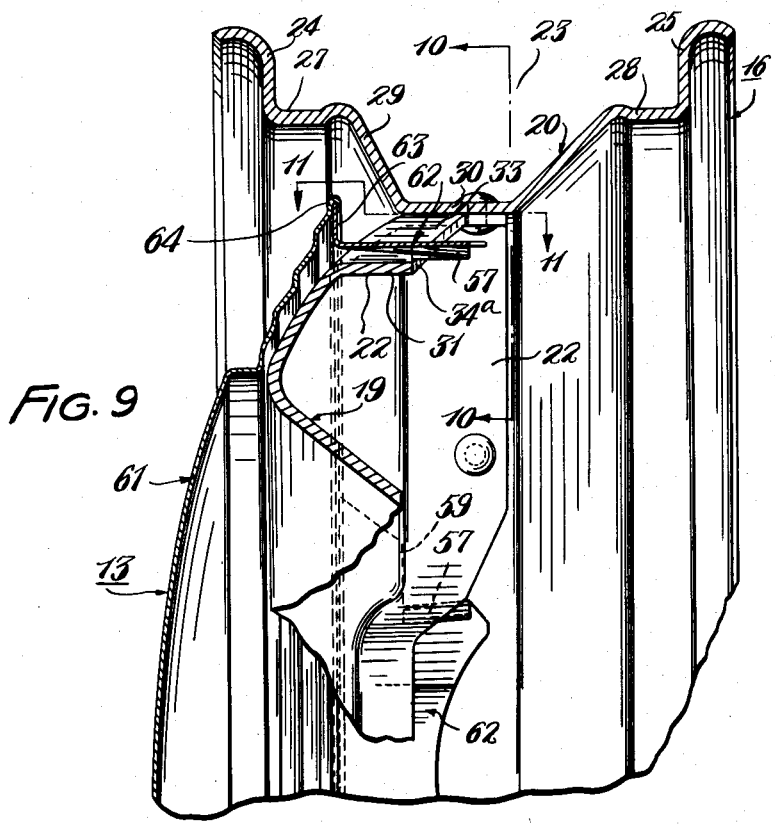
Fig. 9 is a partial vertical section similar to Figs. 2 and 6, but showing another modified form of the novel wheel cover.

Proceeding now with a more detailed description, reference will first be made to the wheel cover 10 of Figs. 1 to 4 inclusive which is shown applied to a vehicle wheel 11. Figs. 6, 9 and 12 show other wheel covers 12, 13 and 14 which are applied to vehicle wheels 15, 16 and 17 respectively. The modified wheel covers 12, 13 and 14 are of the same general type as the wheel cover 10 and will be described in detail hereinafter. All of the wheel covers 10, 12, 13 and 14 are detachably applied to the vehicle wheels and in their applied position extend over a substantial portion of the front or outer face of the vehicle wheel so as to constitute both a trim device for the wheel and a protective shield for various parts of the wheel structure.

The vehicle wheels 11, 15, 16 and 17 are of an identical construction and are here shown as being a more or less conventional form of vehicle wheel of the kind intended to have a pneumatic tire mounted thereon. Since these wheels are of the same construction, a detailed description given at this point for the wheel 11 will serve for all of the other wheels 15, 16 and 17.

The wheel 11 comprises, in general, a substantially cylindrical bulged-disk body part 19 and a tire rim part 20 extending around and connected with the body part. The body part 19 is provided with a central wheel hub attaching portion 21 and an axially rearwardly extending peripheral annular flange 22. The rim part 20 is a metal ring member of channel-shaped cross-section defining an outwardly opening channel recess 23 in which the pneumatic tire can be mounted. This rim part comprises front and rear annular radial flanges 24 and 25 and an intermediate annular felly or connecting portion 26. The annular portions of the felly, which are located immediately adjacent the radial flanges 24 and 25 define annular tire bead seats 27 and 28. The portion of the felly located between the tire bead seats 27 and 28 define a drop-center portion 29 having a flat annular bottom wall 30.

The rim part 20 is connected with the body part 19 by having its bottom wall 30 secured to the flange 22 at a plurality of points as by means of welding or by the rivets 20ª. At circumferentially spaced points thereof the flange 22 is provided with portions which are of a relatively narrower axial width and are displaced radially inwardly to define the offsets 31. These offsets cooperate with adjacent portions 32 of the bottom wall 30 to define therebetween the wheel openings 33. These wheel openings constitute a circumferentially aligned series of circumferentially elongated openings, usually four in number, although the series may comprise any number of such openings.

With respect to the shape of the offsets 31 and of the wheel openings 33, it will be observed that the end portions 34 of each offset have a circumferentially and inwardly inclined rear edge 34ª, to which further reference will presently be made, and that these ends 34 approach the adjacent portions 32 of the rim wall 30 so as to define circumferentially converging corner crevices 33ª at opposite ends of each wheel opening.

The wheel cover 10 comprises, in general, an outer disk member 35 and an annular group of rearwardly projecting retaining members 36 connected with such disk member and engageable in the wheel openings 33 for connecting the cover with the vehicle wheel 11. The retaining members 36 correspond in number with the wheel openings 33 and in the cover here shown are four in number.

Figure 1:
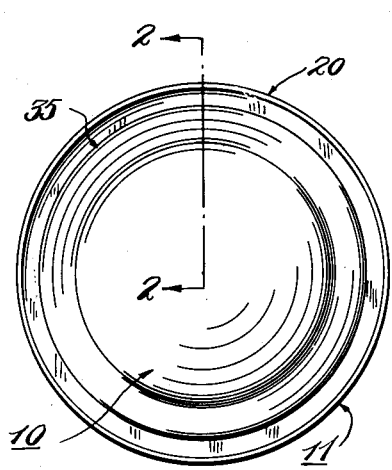
Fig. 1 is a front elevation showing a vehicle wheel having a novel wheel cover of the present invention applied thereto.
Figure 2:
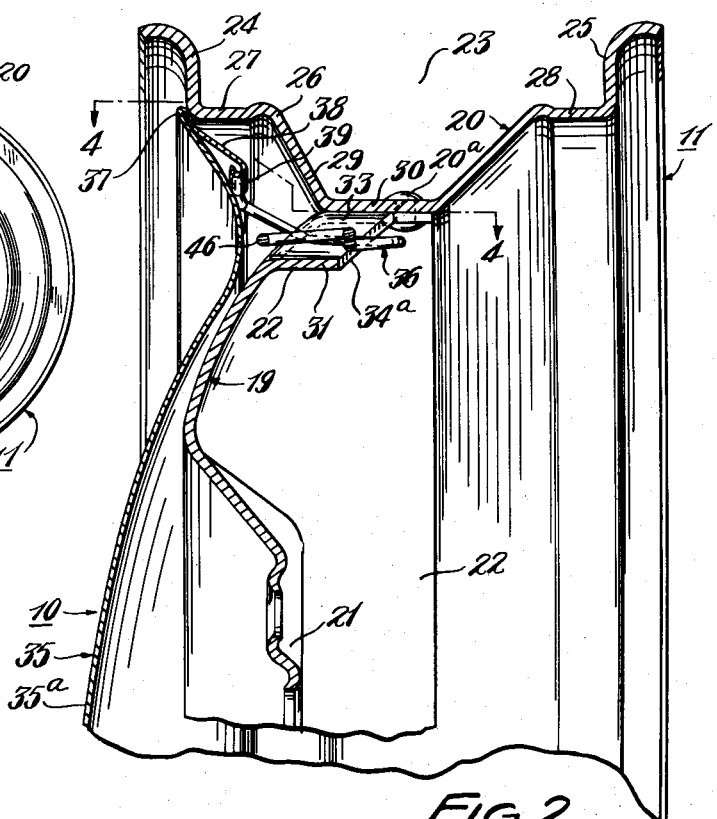
Fig. 2 is a partial vertical section taken through the wheel and cover of Fig. 1 substantially as indicated by section line 2—2.

The disk member 35 comprises a substantially circular sheet metal member having a central portion 35ª which is here shown as being a forwardly bulged portion, but which can have any other desired ornamental shape or decorative configuration. The disk member 35 is provided at its peripheral outer edge with an annular bead 37 and may be of a diameter to extend over any desired portion or extent of the front or outer side of the vehicle wheel 11. In this instance, the disk member 35 is of a diameter to somewhat overlap the radial flange 24 of the rim part 20 such that the annular peripheral bead 37 will seat against this flange when the cover is in its fully applied position on the vehicle wheel 11 as shown in Fig. 2.

The cover 10 also comprises a rear annular flange 38 which is here shown as being formed by a sheet metal ring member which is secured to the disk member 35 by having one annular edge thereof engaged in or connected with the peripheral annular bead 37. The flange 38 extends both axially rearwardly and radially inwardly from the peripheral bead 37 in an inclined relation converging rearwardly relative to the axis of the wheel 11 and is provided at its rear or free edge with an annularly extending hollow bead 39.

The retaining members 36 are connected with and carried by the rear flange 38 of tthe cover 10 and in the construction here shown for this cover, these retaining members are formed by bent portions of a wire ring 40 which is connected with the flange 38 by being disposed in the hollow bead 39.

Figure 3:
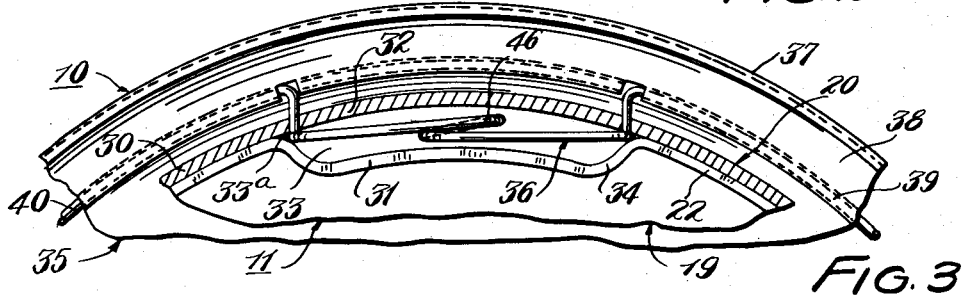
Fig. 3 is mainly a rear elevation of the cover at the location of one of the retaining members, but also shows adjacent wheel portions with which the retaining member cooperates.
Figure 4:
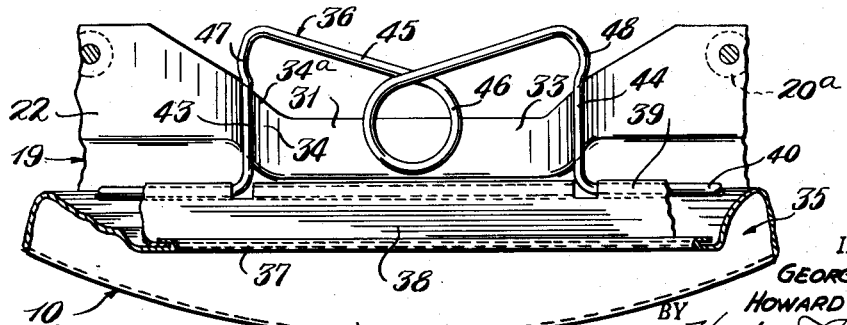
Fig. 4 is a partial circumferential section taken through the vehicle wheel at the location of one of the cover retaining members, the view being taken approximately as indicated by section line 4—4 of Fig. 2.
Figure 5:
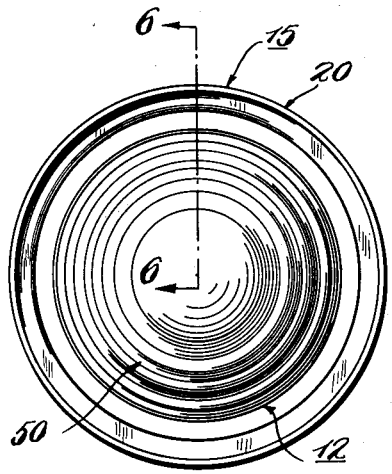
Fig. 5 is a front elevation showing a vehicle wheel and a modified form of the novel cover applied thereto.

The retaining members 36 are of a size and shape to be insertable into the wheel openings 33 for mounting the cover 10 on the vehicle wheel 11. The retaining members 36 are elongated circumferentially and are disposed in a circumferentially edgewise aligned relation in an annular series such that when the cover is in its applied position on the wheel, the retaining members will extend across these openings in the relation of a chord as shown in Fig. 3. For the accomplishment of this purpose, the retaining members 36 are constructed so as to be compressible and expansible substantially in the direction of the circumference of the series and this flexibility permits the insertion of these retaining members into the wheel openings 33 and enables the retaining members to expand in these openings and produce a locked condition with the wheel structure.

Each of the retaining members 36 comprises a pair of circumferentially spaced axially rearwardly extending arms 43 and 44 formed by rearwardly bent portions of the wire ring 40 and a generally circumferentially extending connecting portion 45 connecting the arms 43 and 44 at the rear ends thereof. The connecting portion 45 preferably has a spring coil 46 formed therein and which imparts increased flexibility to the retaining member 36. The arms 43 and 44, and the connecting portion 45 including the spring coil 46, are all defined by integrally connected portions of the wire ring 40. Substantially at the junction of the connecting portion 45 with the arms 43 and 44, the latter are provided with oppositely extending offsets forming a pair of circumferentially spaced locking elements 47 and 48 of a convex rounded shape. The arms 43 and 44 are of a greater axial length than the width of the offset 31 of the wheel body part 19.

When the cover 10 is in its applied position on the wheel 11, opposite edges of the retaining members 36 are located in the crevices 33ª but all other portions of the retaining members remain in a spaced relation to the wheel structure. In their released or free condition the retaining members 36 are of a circumferential length which is slightly greater than the circumferential length of the wheel openings 33, such that when they are inserted into the openings their expansive tendency will cause the opposite edges thereof to move into the crevices 33ª to thereby engage the locking elements 47 and 48 behind the inclined rear edge portions 34ª of the offsets 31 and produce the desired holding engagement of the retaining members in the wheel openings.

The wire ring 40 is made of a relatively stiff springy wire, for example piano wire, such that the retaining members 36 will be resiliently flexible and will have the above-explained characteristic of being compressible and expansible edgewise thereof in the direction of the circumference of the series. This compressible and expansible characteristic of the retaining members 36 permits them to be inserted through the wheel openings 33 and causes the arms 43 and 44 to spring apart into the crevices 33ª and engage the locking elements 47 and 48 behind the inclined rear edges 34ª.

The retaining members 36 are here shown as being connected with the disk member 35 on a circumference which lies at a greater radial distance from the axis of the wheel than the openings 33, but, if desired, this point of connection could be made at a shorter radial distance, as for instance, at a point substantially opposite the wheel openings. Although the retaining members 36 have a strong holding engagement in the wheel openings 33 such as to prevent accidental disengagement of the wheel cover, they can, nevertheless, be readily withdrawn from the wheel openings by the application of a simple prying force to the peripheral bead portion of the cover by a suitable prying tool.

The wheel cover 12 of Figs. 5 to 8 inclusive is a modified form of cover as mentioned above, and comprises, in general, a disk member 50 and an annular group of rearwardly projecting retaining members 51, for example four such retaining members, disposed in a circumferentially edgewise aligned relation in a circumferential series and engageable in the wheel openings 33.

The disk member 50 is a substantially circular sheet metal member having a forwardly dished central portion 50ª and a hollow annular bead 52 extending around its outer periphery. The disk member 50 can be of a diameter to extend over any desired portion of the front face of the vehicle wheel 15 and, as here shown, is of a diameter to extend in somewhat overlapping relation to the drop-center portion 29 of the rim part 20.

The cover 12 also comprises a rear annular flange 53 which is here shown as being a radially disposed flange formed by a sheet metal ring member 54 which carries the retaining members 51. The ring member 54 is connected with the cover 12 by the engagement of the outer edge of the radial flange 53 in the hollow peripheral bead 52 of the disk member 50. As shown in the drawings, the retaining members 51 and the flange 53 constitute integrally connected portions of the sheet metal ring 54.

Figure 8:
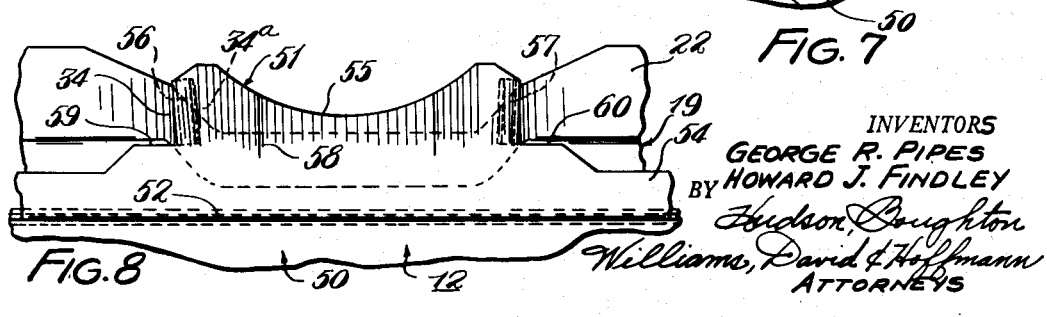
Fig. 8 is a partial circumferential section taken through the vehicle wheel at the location of one of the retaining members of the modified cover, the view being taken substantially as indicated by section line 8—8 of Fig. 6.

Each of the retaining members 51 comprises a circumferentially elongated sheet metal web 55 which extends across one of the wheel openings 33 in the relation of a chord when the cover 12 has been applied to the vehicle wheel 15. At the opposite edges thereof, each of the retaining members 51 is provided with axially rearwardly extending beads 56 and 57 which extend in rearwardly diverging relation, as shown in Fig. 8, and constitute locking elements. The locking elements 56 and 57 are formed by partially sheared end portions of the web 55 which have been rolled into hollow bead form.

The retaining members 51 are compressible and expansible edgewise thereof and in the direction of the circumference of the series in substantially the same manner and for the same purpose as has been already explained above for the retaining members 36. This resilient characteristic for the retaining members 51 is obtained in part by making the ring member 54 out of a relatively stiff springy sheet metal and in part by making the webs 55 of the retaining members of a corrugated or ribbed shape. The web 55 can be shaped by dies or other suitable means so as to have one or more corrugations 58 therein, preferably corrugations of small amplitude, such that the web will have the above-explained desired edgewise flexibility. In this instance, the web 55 is shown as having two such corrugations 58 formed therein. The corrugations 58 also increase the strength and stiffness of the retaining members and render them less likely to become bent or otherwise damaged.

At the points where the metal for the locking elements 56 and 57 has been sheared from the web 55, a pair of rearwardly facing straight shoulders 59 and 60 are defined on the ring member 54. When the retaining member 51 has been inserted into the wheel opening 33, the shoulders 59 and 60 engage the wheel structure at opposite ends of the opening and by seating thereagainst are effective for holding the disk member 50 in a substantially uniformly spaced relation in front of the wheel structure, as shown in Fig. 6.

The locking elements 56 and 57 are of a greater axial length than the width of the offset 31 of the wheel body part 19 and when the cover 12 has been applied to the wheel 15, the ends of these locking elements will project rearwardly beyond the end portions 34 of the offset. Because of the diverging relation of the locking elements 56 and 57, their movement into the crevices 33ᵃ by the circumferential expansion of the retaining member 51 will cause the rearwardly overhanging portions of these locking elements to engage behind the inclined rear edges 34ᵃ of the offset 31 to thereby lock the cover on the wheel.

Figure 10:
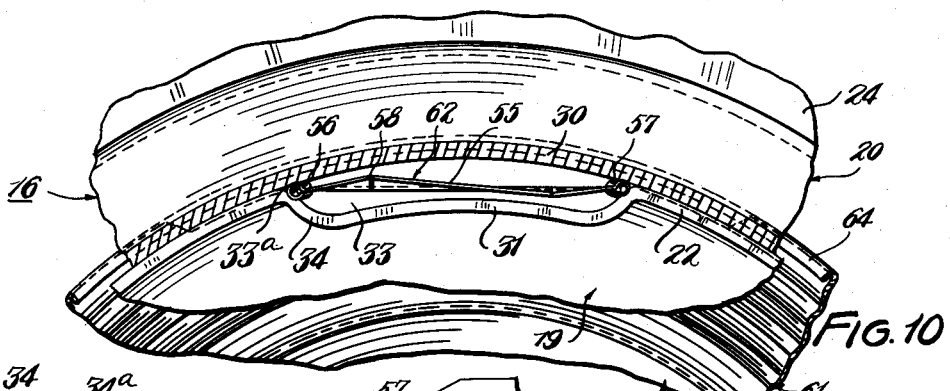
Fig. 10 is a partial vertical section taken through the wheel and looking toward the cover as indicated by section line 10—10 of Fig. 9.
Figure 11:
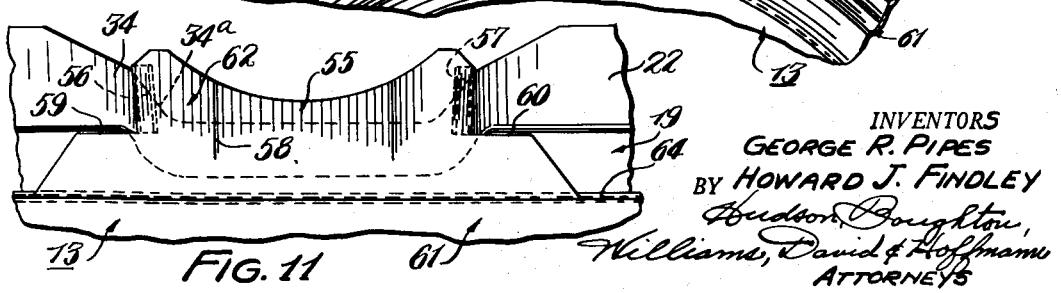
Fig. 11 is a partial circumferential section taken through the vehicle wheel at the location of one of the retaining members of the modified cover of Fig. 9, the view being taken as indicated by section line 11—11 of Fig. 9.

Figs. 9, 10 and 11 show the cover 13 as another modified form of the present invention and applied to the vehicle wheel 16 in the same relation and manner as the cover 12. The cover 13 is similar to the above-described cover 12 in that it comprises a sheet metal disk member 61 and an annular group of rearwardly projecting retaining members 62 disposed in edgewise relation in a circumferential series, in this case four such retaining members, for engagement in the openings 33 of the vehicle wheel 16. The retaining members 62 are identical in construction with and function in the same manner as the retaining members 51, except that they are individually connected with the disk member 61 instead of being connected with a sheet metal ring member which is in turn connected with the disk member.

In the cover 13, the retaining members 62 are spaced around the periphery of the disk member 61 at locations to correspond with the locations of the wheel openings 33 and each of these retaining members is provided with an outturned radial flange 63. The retaining members 62 are mounted on the disk member 61 by the locked engagement of the radial flanges 63 in a hollow annular bead 64 extending around the outer periphery of the disk member. Since the wheel cover 13 is, in all other respects, substantially identical with the wheel cover 12 the same reference characters have been applied to corresponding parts thereof.

The wheel cover 14 of Figs. 12, 13 and 14 is of a construction generally similar to that of the wheel covers 12 and 13 in that it comprises a substantially circular disk member 66 and an annular group of rearwardly projecting retaining members 67 disposed in edgewise relation in a circumferential series and engageable in the openings 33 of the vehicle wheel 17. The retaining members 67 are substantially identical in construction with the retaining members 51 and 62 described above and function in the same manner in their engagement in the wheel openings 33 and in detachably mounting the cover 14 on the vehicle wheel 17.

The cover 14 differs from the covers 12 and 13 in that it is of a one-piece construction, that is to say, all parts of this cover, including the disk member 66 and the retaining members 67, are formed from a single sheet metal blank. The retaining members 67 are connected with the disk member 66 by the peripheral annular bead 68 of the latter and by the radial annular rear flange 69. Since the cover 14 is a one-piece cover, the retaining members 67 are in integrally connected relation with the disk member 66 by the bead and flange elements 68 and 69. The bead 68 is an annularly continuous bead. The rear flange 69 can be an interrupted flange or can be annularly continuous, depending upon the size and shape of blank from which the cover 14 is produced.

When the cover 14 is provided with four of the retaining members 67, as in the construction here shown, the cover is made from a sheet metal blank which is of a substantailly square shape, such as the blank 70 shown in Fig. 15. In forming the cover 14 from the blank 70, the central portion 70ᵃ of the blank produces the disk portion 66 of the cover and the four retaining members 67 are produced from the corner portions 70ᵇ of the blank. By constructing the cover 14 from the one-piece square blank 70 in this manner, it will be seen that the cover can be produced very economically because only a small amount of the sheet metal of the blank will be wasted as scrap material.

From the foregoing description and the accompanying drawings, it will now be readily understood that this invention provides a novel wheel cover which constitutes both a trim device and a protective shield and which can be readily applied to or removed from a vehicle wheel and in its applied position will be securely retained on the wheel. It will also be seen that this novel wheel cover is provided with an annular series of rearwardly projecting retaining members which are resiliently flexible edgewise thereof and in the direction of the circumference of the series for insertion into and withdrawal from the circumferentially spaced openings of the vehicle wheel. Additionally, it will be seen that the retaining members can be either in the form of bent wire or can be in the form of a sheet metal web, preferably a corrugated web, and when engaged in the wheel openings extend in a substantially chordal relation thereacross.

Although the novel wheel cover of the present invention has been illustrated and described herein to a somewhat detailed extent, it will be understood, of course, that the invention is not to be regarded as being limited correspondingly in scope, but includes all changes and modifications coming within the terms of the claims hereof.

Having thus described our invention, we claim:

1. A wheel cover comprising, substantially circular sheet metal cover means, and an annular series of retaining members in the form of circumferentially spaced and substantially circumferentially extending and edgewise aligned sheet metal webs connected with said cover means and projecting generally axially rearwardly therefrom, said webs having bowed intermediate portions such that said retaining members are resiliently flexible for compression and expansion substantially edgewise thereof and substantially in the direction of the circumference of said series.

2. A wheel cover comprising, a sheet metal disk member having a peripheral bead, means connected with said disk member at said peripheral bead and defining a rear flange, and an annular series of circumferentially spaced and substantially circumferentially edgewise aligned retaining members carried by said flange and extending generally axially rearwardly relative to said disk member, said retaining members being resiliently flexible edgewise thereof and substantially in the direction of the circumference of said series and being made of sheet metal and formed by segments of said flange having radially oppositely offset bowed portions therein.

3. In combination with a vehicle wheel of the type having connected body and rim parts and spaced circumferentially elongated and circumferentially aligned openings defined by cooperating portions of said body and rim parts, a wheel cover comprising substantially circular sheet metal cover means having a peripheral bead, means connected with said disk member at said peripheral bead and defining a rear flange, and an annular series of circumferentially spaced and substantially circumferentially edgewise aligned sheet metal retaining members formed by segments of said rear flange and projecting generally axially rearwardly from said cover means, said retaining members being resiliently flexible edgewise thereof and substantially in the direction of the circumference of said series and being of a circumferential length to be insertable into said openings substantially chordally thereof and to have holding engagement with a rear edge of one of said parts for connecting said cover with said wheel.

4. A wheel cover comprising, a sheet metal disk member, a sheet metal ring member including a substantially radial annular flange, means defining a peripheral bead extending around said disk member and connecting said flange therewith, and an annular series of retaining members formed by integral portions of said sheet metal ring member and projecting generally axially rearwardly from said flange, said retaining members being disposed in circumferentially spaced and substantially circumferentially edgewise aligned relation and comprising circumferentially elongated web segments having substantially radially bowed intermediate portions and which web segments are resiliently flexible substantially circumferentially edgwise thereof.

5. A wheel cover comprising, a sheet metal disk member, an annular series of sheet metal retaining members projecting generally axially rearwardly from said disk member and having outturned radial flange means, and means defining a peripheral annular bead extending around said disk member and connecting said radial flange means therewith for mounting said retaining members on said disk member, said retaining members each comprising a resiliently flexible corrugated web.

6. A wheel cover comprising, a sheet metal disk member, an annular series of sheet metal retaining members projecting generally axially rearwardly from said disk member and having outturned radial flange means, and means defining a peripheral annular bead extending around said disk member and connecting said radial flange means therewith for mounting said retaining members on said disk member, said retaining members each comprising a resiliently flexible corrugated web and locking elements defined by beads formed on opposite edges of said web.

7. A wheel cover as defined in claim 6 in which said beads extend in rearwardly diverging relation.

8. A wheel cover comprising, a sheet metal disk member, an annular series of sheet metal retaining members projecting generally axially rearwardly from said disk member and having outturned radial flange means, means defining a peripheral annular bead extending around said disk member and connecting said radial flange means therewith, said retaining members each comprising a resiliently flexible corrugated web, beads carried by said web and extending rearwardly along opposite edges thereof, and rearwardly facing shoulders on said web adjacent said beads.

9. A one-piece sheet metal wheel cover comprising, a disk member, an annular series of retaining members integrally connected with said disk member and projecting generally axially rearwardly therefrom, said retaining members comprising circumferentially extending resiliently flexible corrugated webs.

10. The combination defined in claim 3 in which said sheet metal retaining members are corrugated.

11. The combination defined in claim 3 in which said sheet metal retaining members have rearwardly and circumferentially divergent beads on opposite edges thereof for said holding engagement with said rear edge.

12. A wheel cover as defined in claim 9 in which said disk member and said retaining members are formed respectively by integrally connected central and corner portions of a substantially square one-piece sheet metal blank.

References Cited in the file of this patent

UNITED STATES PATENTS

| 1,944,658 | Griffith | Jan. 23, 1934 |
| 2,089,952 | Fergueson | Aug. 17, 1937 |
| 2,279,332 | Lyon | Apr. 14, 1942 |
| 2,279,704 | Davenport | Apr. 14, 1942 |
| 2,551,327 | Horn | May 1, 1951 |
| 2,595,873 | Mulhern | May 6, 1952 |

FOREIGN PATENTS

| 986,826 | France | Aug. 6, 1951 |